UNITED STATES PATENT OFFICE.

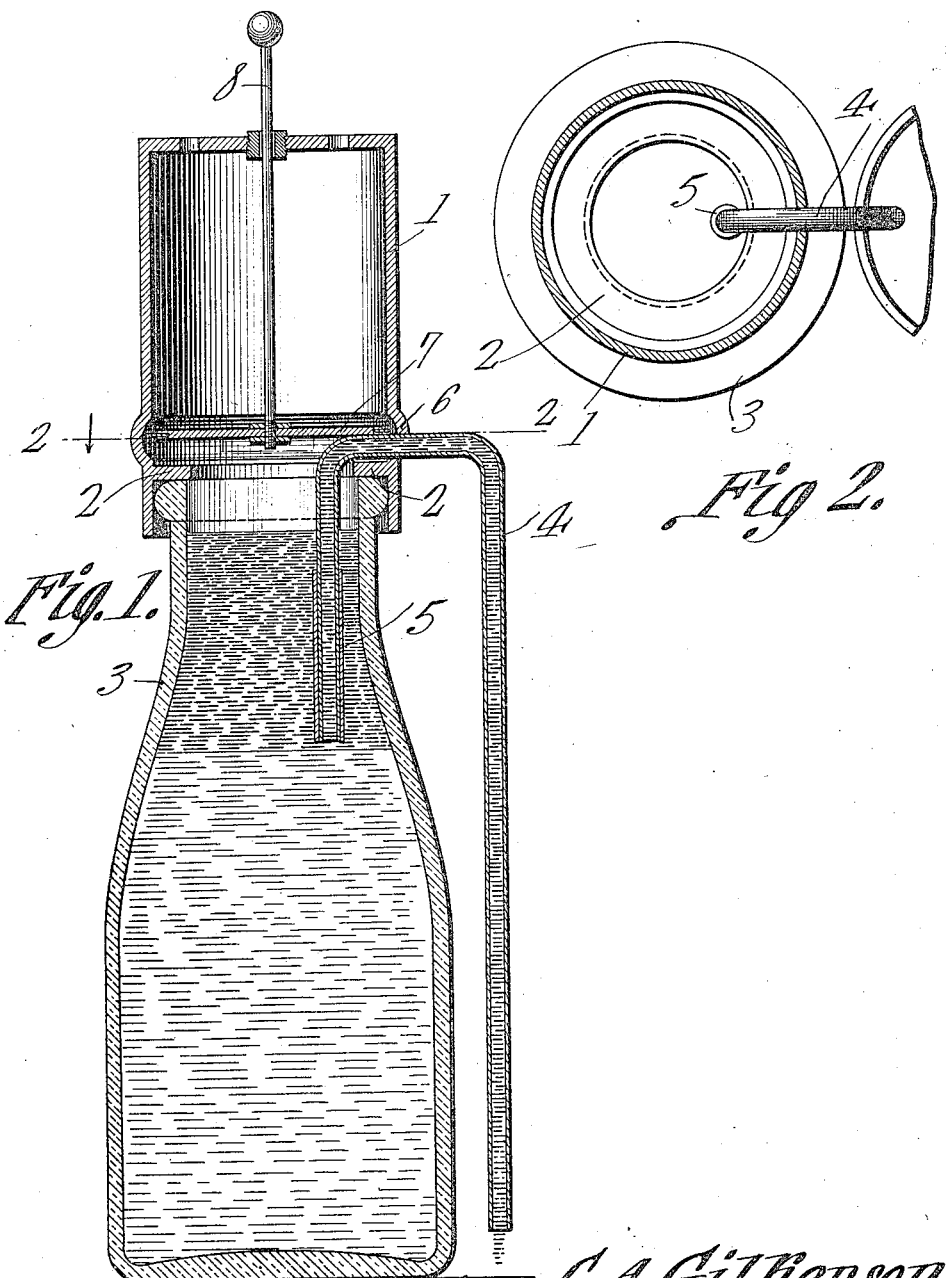

CHESTER A. GILKERSON, OF JOLIET, ILLINOIS.

SIPHON-SKIMMER.

1,016,938.

Specification of Letters Patent.  Patented Feb. 13, 1912.

Application filed January 26, 1911. Serial No. 604,886.

*To all whom it may concern:*

Be it known that I, CHESTER A. GILKERSON, a citizen of the United States, residing at Joliet, in the county of Will and State of Illinois, have invented a new and useful Siphon-Skimmer, of which the following is a specification.

This invention has relation to siphon skimmers and consists in the novel construction and arrangement of its parts as hereinafter shown and described.

The object of the invention is to provide a skimmer of the character indicated especially adapted to be used for skimming the cream from the body of milk contained within a vessel and including means whereby the cream may be effectually removed without removing the milk irrespective of the thickness of the cream.

With the above object in view the device includes a cylindrical body in which is mounted a slidable piston. The intermediate portion of a siphon tube is secured to the lower portion of the said body and the shorter leg of the said tube is provided with an adjustable sleeve through which the cream is drawn from the body of milk without regard to the thickness or depth of the volume of cream.

In the accompanying drawing:—Figure 1 is a sectional view of the device. Fig. 2 is a horizontal sectional view of the same cut on the line 2—2 of Fig. 1.

As hereinbefore stated the device is especially adapted to be used for removing the cream from a body of milk and furthermore it is adapted especially to be used in conjunction with the ordinary milk bottles now used for serving milk from a dealer to a consumer.

The device consists of a cylindrical body 1 having in its interior and in the vicinity of its lower end a flange 2. The body 1 is open at its lower end and within the lower end portion is adapted to receive the upper end of a bottle 3 upon the top of which will rest the flange 2. The intermediate portion of a siphon 4 passes transversely through the side of the body 1 above the flange 2 and the shorter leg of the said siphon is adapted to be inserted within the bottle 3. A sleeve 5 is slidably mounted upon the shorter leg of the siphon 4 and has sufficient frictional contact with the same to remain in an adjusted position upon the shorter leg of the siphon after it has been adjusted. The body 1 immediately above the intermediate portion of the siphon 4 is slightly swelled in an outward direction as at 6. A piston 7 is slidably mounted in the body 1 and fits snugly within the upper portion thereof closing the same diametrically. A stem or handle 8 is attached to the piston 7 and passes through a guide provided at the upper end of the body 1.

In operation the top portion of the bottle 3 is inserted within the lower portion of the body 1 and the flange 2 rests upon the upper edge of the said bottle. The shorter leg of the siphon 4 is projected down into the cream contained within the bottle 3 until the lower end of the shorter leg of the said siphon is at the bottom of the cream. If the cream varies in depth the sleeve 5 may be adjusted upon the shorter leg of the siphon so that the lower end of the said sleeve will be at the bottom of the cream. The piston 7 at this time is at the upper end of the body 1. An operator then pushes the handle or stem 8 in a downward direction which carries with it the piston 7 and the air contained within the body 1 below the piston 7 is compressed against the upper surface of the cream contained within the bottle 3. This will force the cream up through the sleeve 5 and shorter leg of the siphon 4 over the intermediate portion of the said siphon and down through the longer leg thereof. Thus the siphon is started and when the piston arrives at the swelled portion 6 in the body 1 the surface of the cream contained within the bottle 3 is subjected to the pressure of the external atmosphere for the reason that the piston 7 does not fit snugly within the swelled portion 6 and consequently there is space between the edge of the piston and the inner side of the swelled portion 6. Therefore the siphonage will continue until the surface of the cream is at or below the level of the lower end of the shorter leg of the siphon 4 or its tube 5 when the siphon will be broken and the cream is removed from the bottle 3 without disturbing the milk. While the present device is especially adapted to be used for removing cream from a bottle containing both cream and milk it is to be understood that it may be used to advantage for other purposes where it is desired to remove a liquid from a vessel to a predetermined depth below the surface of the liquid contained within the vessel.

Having described my invention what I claim as new and desire by Letters Patent is:—

1. A skimmer comprising an open ended body, said body being diametrically enlarged at a point between its ends, a siphon passing through the side of the body below the enlarged portion thereof, a piston mounted for reciprocation in the said body and arranged to pass into the said enlarged portion at the end of the stroke toward the open end of the said body, and a sleeve adjustably mounted on the shorter leg of the siphon.

2. A skimmer comprising an open ended body having in the vicinity of its lower end an inner annular flange, said body being diametrically enlarged at a point between its ends, a piston mounted for reciprocation in the body and arranged to pass into the said enlarged portion at the end of the stroke toward the open end of the said body, and a siphon passing through the side of the body at a point above the said flange and below the path of movement of said piston.

3. A skimmer comprising an open ended body, said body being diametrically enlarged at a point between its ends, a siphon passing through the side of the body below the enlarged portion thereof, and a piston mounted for reciprocation in the body, the enlarged portion being at the end of the stroke of the piston toward the open end of the said body, whereby a space is created between the edge of the piston and the said body upon the piston being forced to the end of its stroke toward the open end of the body.

In testimony that I claim the foregoing as my own, I have hereto affixed my signature in the presence of two witnesses.

CHESTER A. GILKERSON.

Witnesses:
JOHN P. EIB,
L. C. BOSTWICK.